Aug. 18, 1936.   A. H. CARLSON   2,051,367
SEAL
Filed Sept. 4, 1935
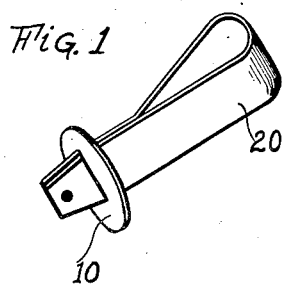
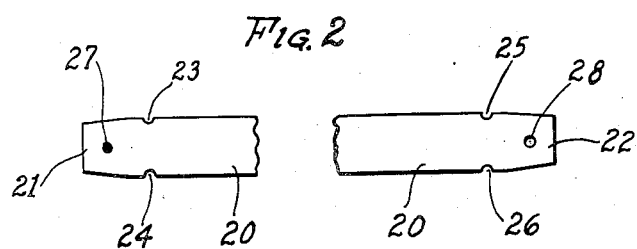
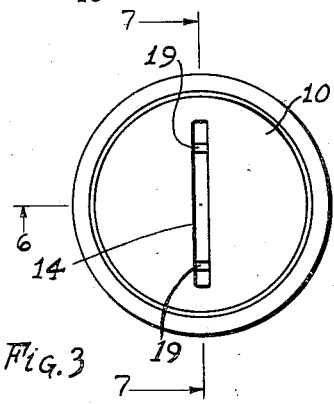
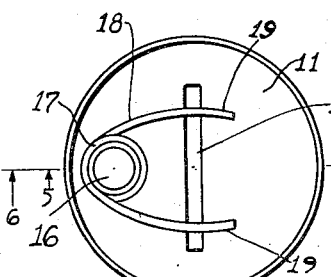
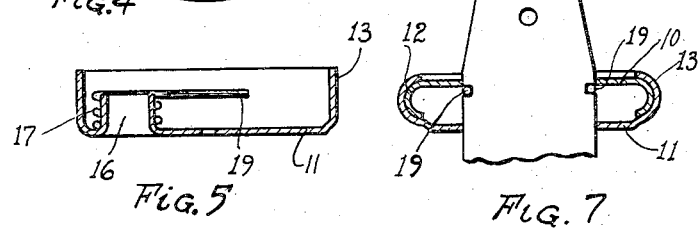
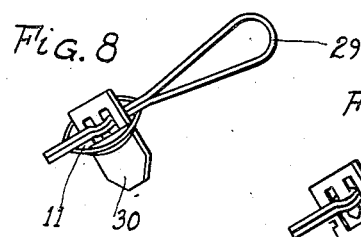
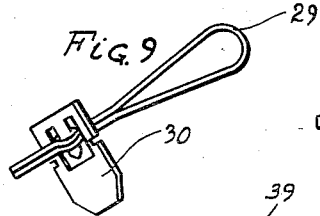
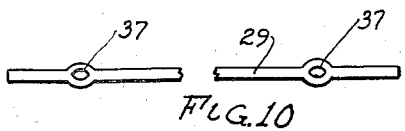
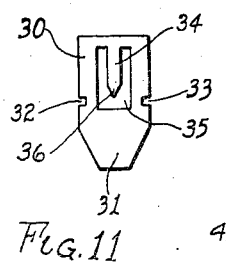
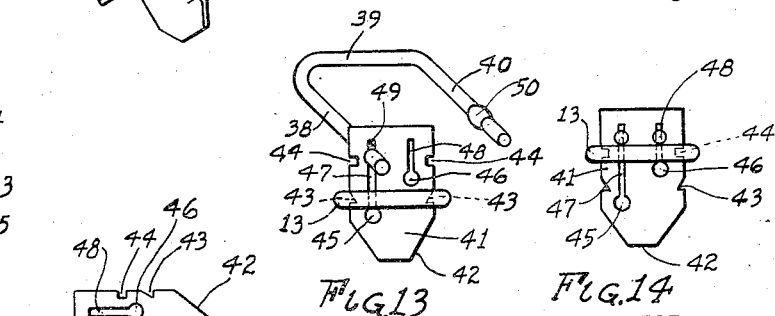
INVENTOR
ANDROV H. CARLSON.
BY
ATTORNEY Patented Aug. 18, 1936

2,051,367

UNITED STATES PATENT OFFICE 2,051,367

SEAL

Androv H. Carlson, Bridgeport, Conn.

Application September 4, 1935, Serial No. 39,084

4 Claims. (Cl. 292—318)

This invention relates to a seal or fastening device adapted to retain a locking key, strap, or the like, and the object of the invention is to provide a novel, simple, durable and inexpensive seal from which a locking key, strap, or the like, once associated with the seal, can be removed only by breaking the seal.

With the above object in view, as well as others which will appear from the specification and claims, the invention comprises the construction, arrangement and combination of parts as now to be fully described and hereinafter specifically claimed, it being understood that the disclosure herein is merely illustrative of the principles of the invention, changes in details of construction and arrangement of parts being permissible so long as within the scope of the appended claims.

In the accompanying drawing forming a part of this specification:

Fig. 1 is a perspective view of a seal or fastening device having the features of the invention, a locking strap being associated with the seal or fastening device;

Fig. 2 is a plan view of the locking strap of Fig. 1;

Fig. 3 is an enlarged plan view of the novel seal;

Fig. 4 is a plan view of the spring carrying disc of the seal, disclosing the locking spring in its normal relation;

Fig. 5 is a sectional view on line 5—5 in Fig. 4;

Figs. 6 and 7 are sectional views, taken as on lines 6—6 and 7—7 in Fig. 3, of the seal and locking strap of Fig. 1;

Fig. 8 is a perspective view of a seal associated with a locking key of novel structure, disclosing a locking strap non-removably secured to the locking key;

Fig. 9 is a perspective view of the locking key and strap assembled together, ready for association with a seal;

Fig. 10 is a plan view of the locking strap of Figs. 8 and 9;

Fig. 11 is an enlarged plan view of the locking key;

Fig. 12 is a plan view of a locking key of modified construction;

Fig. 13 is a plan view of the locking key of Fig. 12, showing a seal and one end portion of a variant form of strap arranged in a slot in said key and permanently associated therewith by said seal; and Fig. 14 is a view corresponding with the showing of Fig. 13 disclosing both end portions of the seal arranged in slots of the locking key and permanently associated with said slots by said seal.

With respect to the drawing and the numerals of reference thereon, 10 and 11 denote, respectively, a pair of spaced apart and preferably parallel discs providing the housing of the improved seal. The disc 10 has an annular flange 12 fitted within an annular flange 13 of the disc 11, said flange 13 encompassing the flange 12 in a manner to secure the discs together.

Through both of discs 10 and 11 are duplicate slots, denoted 14 and 15, respectively, which, as disclosed, extend across the greater portions of the diameters of the discs. When the discs are assembled, the slots align with each other; that is, the slot 14 of the disc 10 and the slot 15 of the disc 11 are directly opposite each other to provide a passageway through the housing of the seal.

The disc 11 has a struck up lug 16 adapted to receive an eye or loop 17 of a coil spring 18 having spaced apart legs 19 which extend transversely across the slots 14 and 15 at a distance from the ends of the slots, as best disclosed in Fig. 4. The disc 10 fits close to the upper end of the lug 16, and, obviously, insures that the eye or loop 17 cannot become removed from the lug, while said lug insures the relation, as disclosed in Fig. 4, of the spring legs 19 to the slots.

Numeral 20 represents a locking strap having tapered end portions 21 and 22. In the side edges of the body of the locking strap and adjacent the tapered end portions are notches, denoted 23, 24, and 25, 26, respectively, the notch 23 being preferably directly opposite the notch 24, and the notch 25 being preferably directly opposite the notch 26. The tapered end portion 21 has a struck up protuberance 27 adapted to enter a hole 28 in the tapered end portion 22. When said protuberance is in said hole, the ends and side edges, respectively, of the locking strap are flush with each other (see Figs. 1, 6 and 7), while all of the notches 23, 24, 25, 26 align; that is, the notches 23, 25 and 24, 26, respectively, are continuations of each other, and the notches 23, 25 are directly opposite the notches 24, 26.

The width of the portions of the locking strap at the location of the notches is preferably about equal to a distance representing the length of each slot 14 and 15, and the double thickness of said locking strap is preferably about equal to the width of each slot. The extremities of the tapered end portions of the locking strap are of a width less than the distance between the legs of the spring 19.

The manner in which the locking strap may be permanently or non-removably associated with the seal is obvious. After the body of said strap has been made to envelop an article to be fastened to or by the seal, the tapered end portions 21 and 22 thereof may be brought together so that the protuberance 27 enters the hole 28. Then said tapered end portions may be inserted through the slots 14 and 15. As said tapered end portions advance through the slots, they pass between the legs 19 of the coil spring and spread said legs apart.

When the end portions reach a position in which the notches 23, 24, 25, 26 are aligned with the legs 19, the legs, owing to the resiliency of the coil spring, move toward each other and simultaneously enter both contiguous and continuing notches 23 and 25, and 24 and 26. The notches are constructed so that thereafter the locking strap can be moved in neither direction through the seal. That is, the locking strap is permanently secured to the coil spring, and the locking strap and seal are thus permanently or non-removably locked together and can only be separated by breaking the seal. Clearly, one end portion of the strap can be first associated with the seal, the strap can then be made to envelop an article, and the other end portion of the strap can be afterwards associated with the seal.

It has been found in practice, when using a relatively small spring, that such spring will withstand force exerted upon the locking strap sufficient to break a disc of the seal. Force applied tending to move the locking device in either direction through the slots of the seal will, when sufficient, first cause the legs 19 to move against a disc 10 or 11. Thereafter, applied force is resisted by the legs 19 as well as by one of the discs. The movement of the locking strap necessary to bring the wire spring into contact with a disc of the seal is very small. In fact, force applied to the strap when once locked gives the strap no motion in the seal which is discernible.

The seal of Fig. 8 may be a duplicate of the seal hereinbefore described. In Figs. 8 to 11 I have shown means adapted to fasten a locking strap 29 to a seal, said strap 29 having a cross-sectional dimension much less than the area of each slot of a seal of relatively small size.

Numeral 30 represents a locking key with a tapered end portion 31 and opposite notches 32 and 33 adjacent the end portions. The extremity of the tapered end portion 31 is of a width to enter the space between the legs 19 of the seal, while the width and thickness of said locking key at said notches 32, 33 preferably fills the slots 14 and 15, as in the instance of the two ends of the strap 20.

The body of the locking key includes a locking pin 34, preferably integral with said body and defined by the cut-out portion 35 thereof, having its free end 36 terminating at a point in the length of said locking key adapted to lie well within a seal when said locking key is assembled with said seal. As illustrated, the free end 36 terminates at a line between the notches 32 and 33, although said free end could terminate closer to the tapered end portion 31.

The locking strap 29 has eyes 37 adjacent its ends adapted to be placed upon said locking pin 34 after the body of said strap 29 shall have been made to envelop an article to be fastened to or by the seal. Then, when the tapered end portion 31 of the locking key shall have been inserted through the slots 14 and 15 until the notches 32 and 33 align with the legs 19 of the coil spring, said legs enter the notches to fasten the locking key in the seal in precisely the manner the strap ends are fastened. Clearly, the locking key being so fastened, and the free extremity of the locking pin 34 entering a slot of the seal to a point well within the seal, the locking strap and locking key are permanently or non-removably associated with each other.

The seal of Fig. 13 may likewise be a duplicate of the seal of Figs. 1 to 7. In Figs. 12 to 14 I have shown means adapted first to fasten one end portion 38 of a locking strap 39 to a seal, and afterwards to fasten the other end portion 40 of said locking strap to said seal. Ordinarily, the end portion 38 will be permanently associated with the seal when the seal is manufactured (whereby a user will have a single article to handle instead of the three disconnected articles of Figs. 8 to 11) and the other end portion of said strap will be attached by the user after said strap has been made to envelop an article to be fastened to or by said seal. The locking strap 39 has cross-sectional dimension much less than the area of each slot of a seal of relatively small area.

Numeral 41 represents a locking key with a tapered end portion 42, opposite notches 43 adjacent the end portion having the taper, and opposite notches 44 spaced from the notches 43 and adjacent the other end portion of the locking key. The extremity of the tapered end portion 42 is of a width to freely enter the space between the legs 19 of a seal, while the width and thickness of said locking key 41 at said notches 43, 44 preferably fill the slots 14 and 15, as in the instance of the other forms of the invention.

The body of the locking key 41 includes an opening 45 between the notches 43 and tapered end portion 42, and an opening 46 between the notches 43 and 44. Each opening 45 and 46 communicates with a slot, denoted 47 and 48, respectively, said slots terminating in the end portion of the locking key 41 opposite the tapered portion 42, beyond the notches 44.

The end portions 38 and 40 of the locking strap 49 are of such a cross-sectional area that they can enter the openings 45 and 46, but greater than the width of said slots 47, 48, and each end portion 38, 40 has a reduced part, denoted 49 and 50, respectively, to fit a slot 47 or 48.

It is to be noted that the notches 44 preclude movement of a seal in either direction upon the locking key 41 when once associated with said notches 44, while each notch 43 has an inclined wall adjacent the notches 44 (opposite the tapered end portion), and a transverse wall adjacent said tapered end portion, whereby a seal once associated with said notches 43 cannot move toward said tapered end portion, but can move toward said notches 44.

To permanently associate the end portion 38 of the locking strap 39 with the locking key 41, said end portion can first be inserted in the opening 45 until the reduced portion 49 thereof aligns with the slot 47, or the reduced portion 49 can be moved into said slot 47. When then a seal has been placed upon the notches 43 in the manner hereinbefore set forth, the end portion 38 is permanently located in said slot. See Fig. 13. To permanently associate the end portion 40 with said locking key, the end portion 40 is made to enter the opening 46 until the reduced portion 50 aligns with or enters the slot 48, and the seal is then moved upon the locking key from the notches 43 to the notches 44. See Fig. 14 wherein the seal is permanently arranged upon the notches 44 and the end portions of the locking strap are in the slots and held away from the openings 45, 46 by the seal.

What I claim is:

1. In combination, a housing having spaced apart members with duplicate slots, a lug on one of said members, a spring within said housing and having an eye fitted upon said lug, said spring including spaced apart resilient legs extending across said slots, and a locking device having a tapered end portion adapted to enter said slots to spread said spring legs apart, said locking device having oppositely disposed notches adapted to be entered by said spring legs.

2. In combination, a seal comprising a housing having spaced apart members with duplicate slots, a spring in said housing and having spaced apart resilient legs extending across said slots, a locking device having a tapered end portion adapted to enter said slots to spread said spring legs, said locking device having oppositely disposed notches adapted to be entered by said spring legs, and said locking device also having locking means adapted to enter said housing when said locking device and housing are assembled together, and a locking strap having fasteners adapted to be associated with said locking means before the locking device is inserted in said seal.

3. In combination, a locking strap having end portions with reduced parts, a locking key having spaced apart, oppositely disposed notches and also having a pair of openings, each opening communicating with a slot in said key, said end portions adapted to freely enter said openings and said reduced parts adapted to enter said slots with material of said end portions extending beyond the confines of said slots, and a housing adapted to be permanently arranged upon said key to lock said end portions in said slots.

4. The combination as specified in claim 3, wherein a set of oppositely disposed notches is adapted to first receive a part of said housing to lock one end portion of the strap to the key, said mentioned notches having inclined walls adjacent other oppositely disposed notches, and wherein said other oppositely disposed notches are adapted to receive a part of said housing to lock the other end portion of the strap to said key.

ANDROV H. CARLSON.